United States Patent
Nishiyori et al.

(10) Patent No.: US 11,325,472 B2
(45) Date of Patent: May 10, 2022

(54) LINE-OF-SIGHT GUIDANCE DEVICE

(71) Applicant: Mitsubishi Electric Corporation, Tokyo (JP)

(72) Inventors: Rena Nishiyori, Tokyo (JP); Toshiyasu Shimbo, Tokyo (JP); Satoshi Iwabuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/968,681

(22) PCT Filed: Apr. 11, 2018

(86) PCT No.: PCT/JP2018/015214
§ 371 (c)(1),
(2) Date: Aug. 10, 2020

(87) PCT Pub. No.: WO2019/198172
PCT Pub. Date: Oct. 17, 2019

(65) Prior Publication Data
US 2021/0001723 A1 Jan. 7, 2021

(51) Int. Cl.
*B60K 35/00* (2006.01)
*G06F 3/14* (2006.01)
(Continued)

(52) U.S. Cl.
CPC ............ *B60K 35/00* (2013.01); *G06F 3/1423* (2013.01); *G06T 7/20* (2013.01); *G06V 20/597* (2022.01);
(Continued)

(58) Field of Classification Search
CPC .............. B60K 35/00; B60K 2370/149; B60K 2370/152; B60K 2370/166;
(Continued)

(56) References Cited

U.S. PATENT DOCUMENTS

| 9,598,010 | B2 * | 3/2017 | Nespolo | B60Q 9/008 |
| 2016/0009175 | A1 * | 1/2016 | Mcnew | H04N 13/383 340/438 |
| 2019/0009796 | A1 * | 1/2019 | Fujii | B60K 35/00 |

FOREIGN PATENT DOCUMENTS

| JP | 2005-59660 A | 3/2005 |
| JP | 2005059660 A * | 3/2005 |

(Continued)

OTHER PUBLICATIONS

International Search Report (PCT/ISA/210) issued in PCT/JP2018/015214, dated Jul. 10, 2018.

*Primary Examiner* — Patrick N Edouard
*Assistant Examiner* — Douglas M Wilson
(74) *Attorney, Agent, or Firm* — Birch, Stewart, Kolasch & Birch, LLP

(57) ABSTRACT

A line-of-sight guidance device includes a vehicle peripheral state acquisition unit configured to acquire information on a peripheral state of a vehicle; a line-of-sight acquisition unit configured to acquire information on line of sight of the driver driving the vehicle; and a display control unit configured to control two or more display units included in a predetermined visual field in association with the line of sight among a plurality of display units mounted on the vehicle, to display a line-of-sight guidance display that is a display for guiding the line of sight of the driver from a first attention target indicated by the line of sight to a second attention target associated with the peripheral state of the vehicle. The first target is an attention target actually watched by the driver. The second attention target is an attention target to be watched by the driver.

3 Claims, 17 Drawing Sheets

(51) Int. Cl.
*G06T 7/20* (2017.01)
*G06V 20/59* (2022.01)
*G06V 40/19* (2022.01)

(52) U.S. Cl.
CPC .. *B60K 2370/149* (2019.05); *B60K 2370/152* (2019.05); *B60K 2370/166* (2019.05); *B60K 2370/182* (2019.05); *B60K 2370/194* (2019.05); *G06V 40/19* (2022.01); *G09G 2354/00* (2013.01); *G09G 2360/04* (2013.01); *G09G 2380/10* (2013.01)

(58) Field of Classification Search
CPC ........ B60K 2370/194; B60K 2370/182; G06F 3/1423; G06F 3/1431; G06K 9/00845; G06K 9/00604; G06T 7/20; G09G 2360/04; G09G 2380/10; G09G 2380/06; G09G 2354/00
See application file for complete search history.

(56) References Cited

FOREIGN PATENT DOCUMENTS

| | | | |
|---|---|---|---|
| JP | 2017-90996 A | | 5/2017 |
| JP | 2017090996 A | * | 5/2017 |

\* cited by examiner

F I G. 1
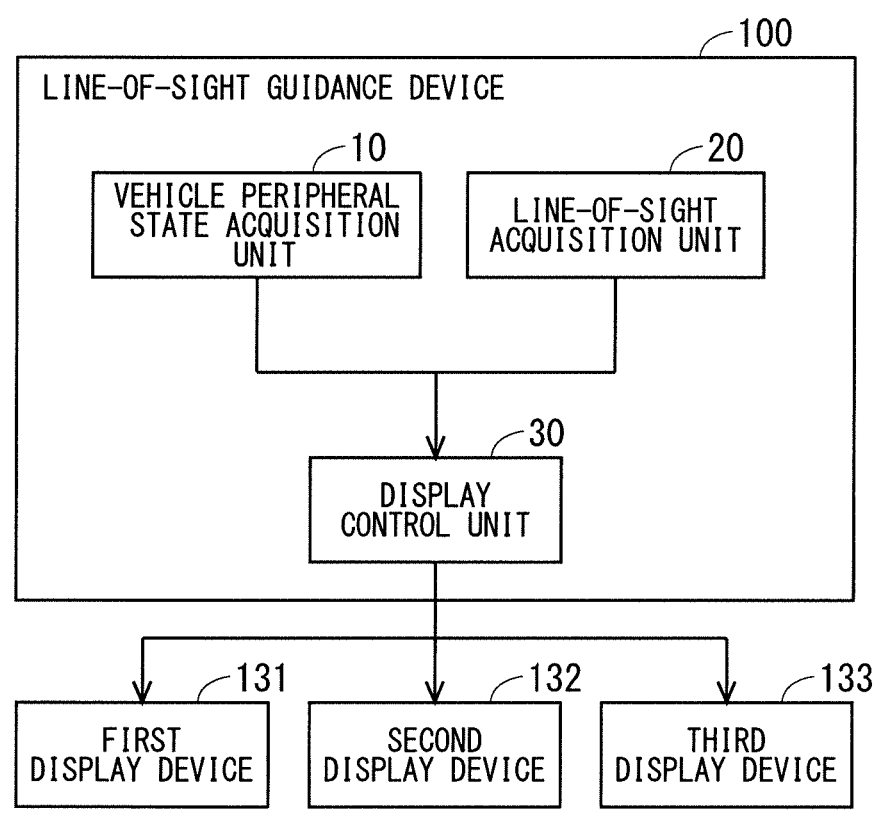

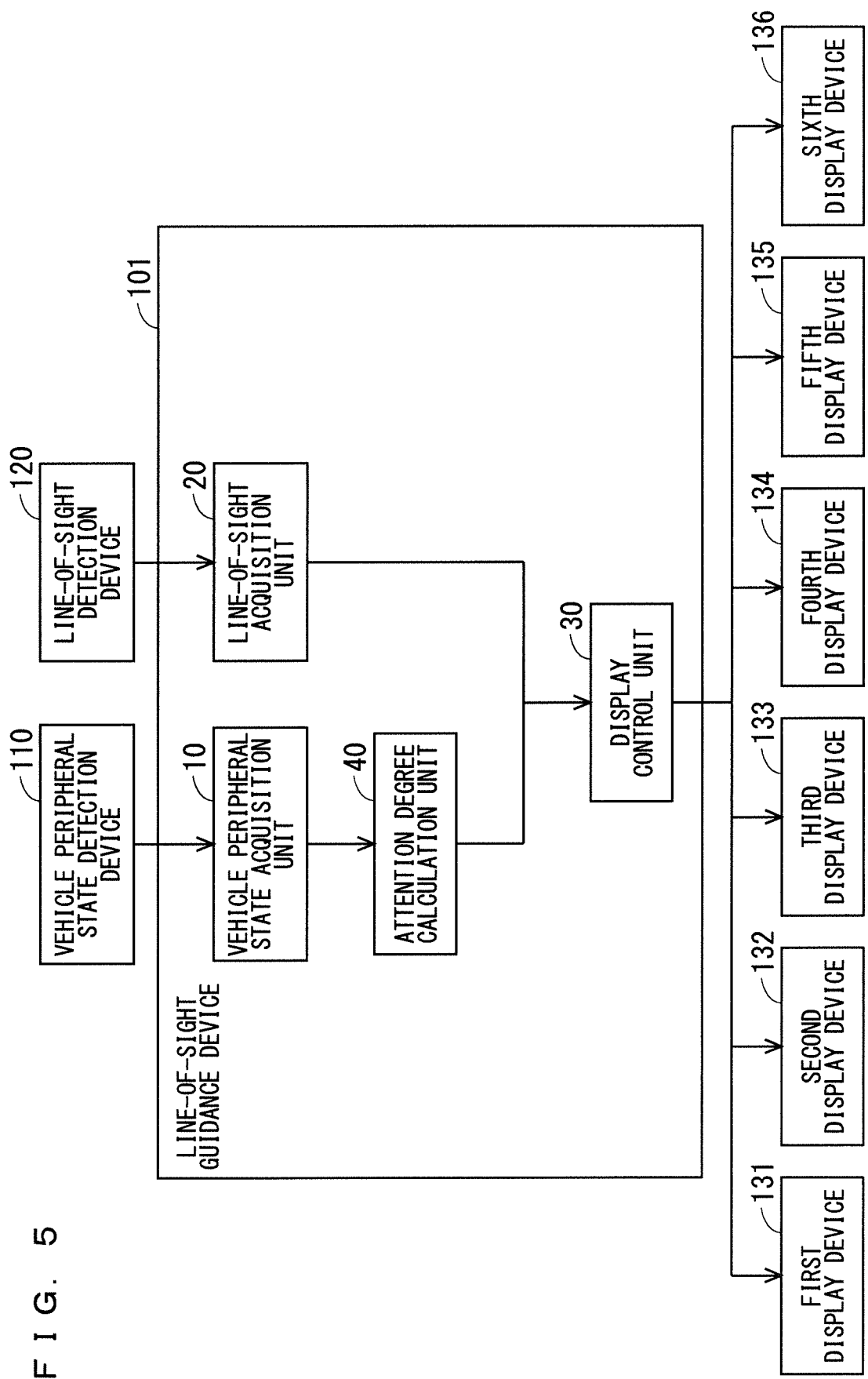
F I G. 5

F I G. 7
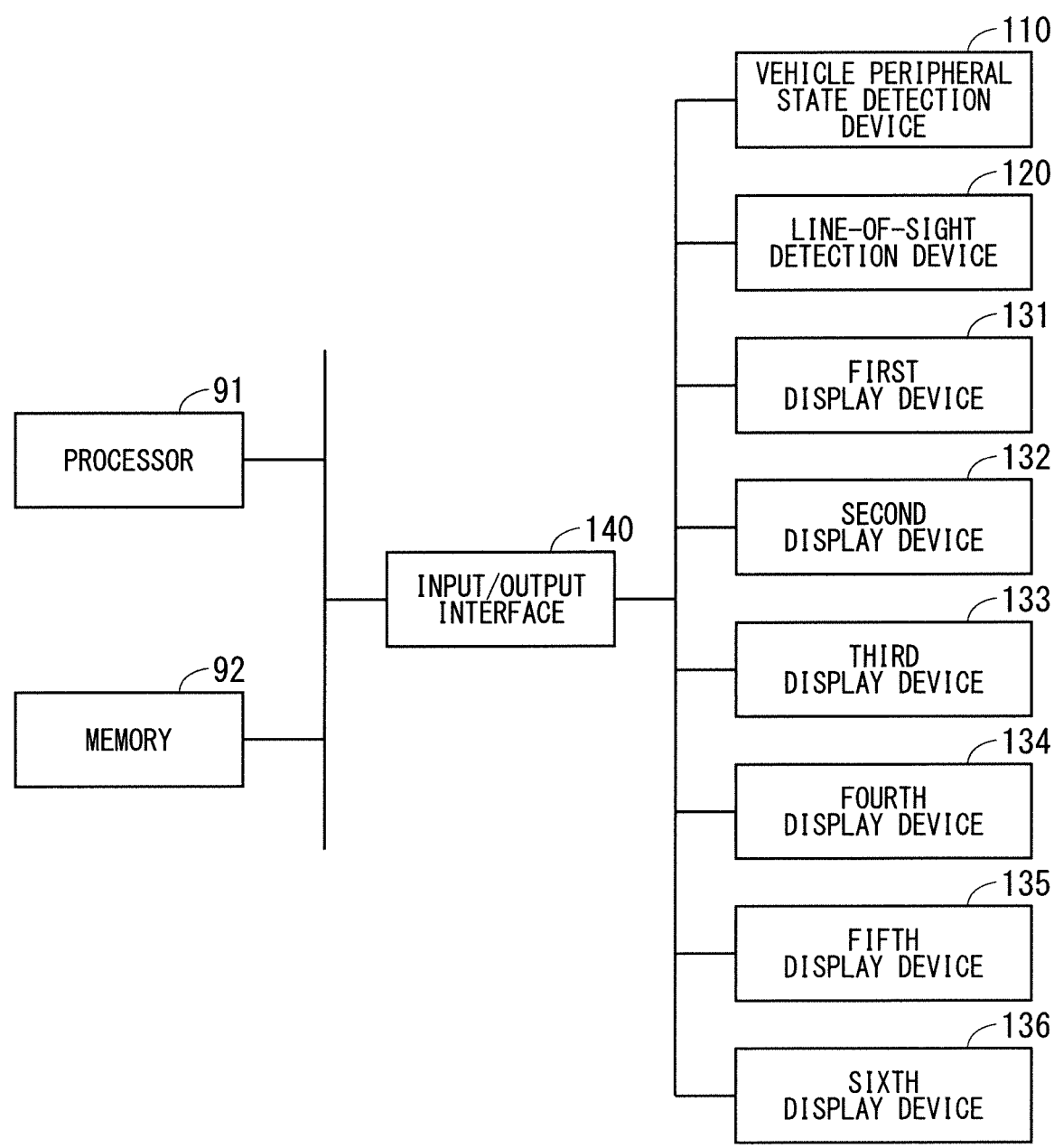

LINE-OF-SIGHT GUIDANCE DEVICE

TECHNICAL FIELD

The present invention relates to a line-of-sight guidance device and a line-of-sight guidance method.

BACKGROUND ART

The display device for a vehicle described in Patent Document 1 displays a guidance display for guiding the line of sight of a driver toward an object that the driver should visually recognize on a display unit located outside the visual field of the driver.

PRIOR ART DOCUMENTS

Patent Documents

[Patent Document 1] Japanese Patent Application Laid-Open No. 2005-059660

SUMMARY

Problem to be Solved by the Invention

However, in some cases, the driver may fail to recognize the guidance display even if the guidance display is displayed on the display unit located outside the field of view.

The present invention has been made in order to solve the above problem, an object of the present invention is to provide a line-of-sight guidance device capable of guiding the line of sight of a driver toward an attention target that the driver should look at with attention with a line-of-sight guidance display displayed at a position visible to the driver.

Means to Solve the Problem

According to the present invention, a line-of-sight guidance device includes a vehicle peripheral state acquisition unit configured to acquire information on a peripheral state of a vehicle; a line-of-sight acquisition unit configured to acquire information on line of sight of the driver driving the vehicle; and a display control unit configured to control two or more display units included in a predetermined visual field in association with the line of sight among a plurality of display units mounted on the vehicle, to display a line-of-sight guidance display that is a display for guiding the line of sight of the driver from the first attention target indicated by the line of sight to the second attention target associated with the peripheral state of the vehicle. The first attention target is an attention target actually watched by the driver. The second attention target is an attention target to be watched by the driver.

Effects of the Invention

According to the present invention, the line-of-sight guidance device capable of guiding the line of sight of the driver toward the attention target that the driver should look at with attention with the line-of-sight guidance display displayed at a position visible to the driver is provided.

The purpose, feature, phase, and advantage of the present invention will be described in detail hereunder with attached drawings.

BRIEF DESCRIPTION OF DRAWINGS

FIG. 1 A block diagram illustrating a configuration of a line-of-sight guidance device and devices that operate in association therewith according to Embodiment 1.

FIG. 5 A block diagram illustrating a configuration of a line-of-sight guidance device and devices that operate in association therewith according to Embodiment 2.

FIG. 7 A diagram illustrating a configuration of hardware of the line-of-sight guidance device according to Embodiment 2.

DESCRIPTION OF EMBODIMENTS

Embodiment 1

Configuration of Line-of-Sight Guidance Device

Figure 2:
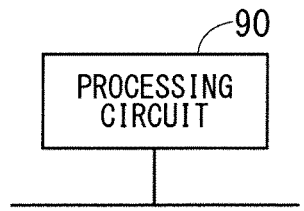
FIG. 2 A diagram illustrating an example of a processing circuit included in the line-of-sight guidance device.

FIG. 1 is a block diagram illustrating a configuration of a line-of-sight guidance device 100 and devices that operate in association therewith according to Embodiment 1.

The line-of-sight guidance device 100 includes a vehicle peripheral state acquisition unit 10, a line-of-sight acquisition unit 20, and a display control unit 30. In addition, FIG. 1 illustrates the first display device 131, the second display device 132, and the third display device 133 as devices that operate in association with the line-of-sight guidance device 100.

The vehicle peripheral state acquisition unit 10 acquires information on the peripheral state of a vehicle (not shown). The peripheral state of the vehicle includes, for example, an abnormal state occurring around the vehicle. The abnormal state includes, for example, an obstacle on the road, a traffic accident, or a natural disaster. Alternatively, the peripheral state of the vehicle includes a road state such as an intersection, a traffic light, and a curvature of a road curve existing around the vehicle. Alternatively, the peripheral state of the vehicle includes a walking state of a pedestrian or a traveling state of another vehicle. The traveling state of the other vehicle includes, for example, a lighting state of the brake lamps, a lighting state of the direction indicators, or the like. The information on the peripheral state of the vehicle includes the peripheral state of the vehicle and the location where the peripheral state exists.

The line-of-sight acquisition unit 20 acquires information on line of sight of a driver driving the vehicle. The information on the line of sight includes information on the attention target actually watched by the driver. The attention target includes a point of attention that is a point located in the direction ahead of the line-of-sight, or the point of attention and a peripheral region of the point of attention.

The display control unit 30 acquires the first attention target actually watched by the driver based on the information on the line of sight of the driver acquired by the line-of-sight acquisition unit 20. The display control unit 30 acquires the second attention target to be watched by the driver. The second attention target is associated with the peripheral state of the vehicle acquired by the vehicle peripheral state acquisition unit 10. Further, among a plurality of display devices, the display control unit 30 selects two or more display devices included in the predetermined visual field in association with the line of sight of the driver. In Embodiment 1, the plurality of display devices include the first display device 131, the second display device 132, and the third display device 133 illustrated in FIG. 1. The display control unit 30 controls the two or more selected display devices to display a line-of-sight guidance display. The line-of-sight guidance display is a display for guiding the line of sight of the driver from the first attention target to the second attention target. Further, the line-of-sight guidance display is a display that urges the driver to be alert by guiding the line of sight of the driver.

Each display device is mounted on the vehicle. The display device is, for example, an infotainment device, an electronic instrument cluster, a head up display (HUD), an electronic mirror, an electronic rearview mirror, or the like.

Processing Circuit

FIG. 2 is a diagram illustrating an example of a processing circuit 90 included in the line-of-sight guidance device 100. Each function of the vehicle peripheral state acquisition unit 10, the line-of-sight acquisition unit 20, and the display control unit 30 is realized by the processing circuit 90. That is, the processing circuit 90 includes the vehicle peripheral state acquisition unit 10, the line-of-sight acquisition unit 20, and the display control unit 30.

When dedicated hardware is applied to the processing circuit 90, the processing circuit 90 is, for example, a single circuit, a composite circuit, a programmed processor, a parallel programed processor, an Application Specific Integrated Circuit (ASIC), a Field-Programmable Gate Array (FPGA), the combination thereof, or the like. Each function of the vehicle peripheral state acquisition unit 10, the line-of-sight acquisition unit 20, and the display control unit 30 may be individually realized by processing circuits, or may be collectively realized by one processing circuit.

Figure 3:
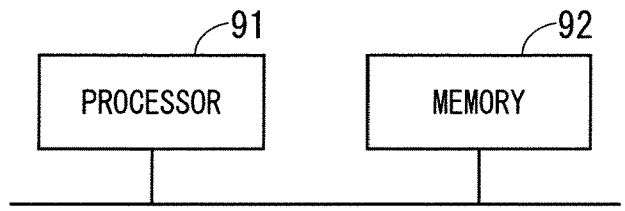
FIG. 3 A diagram illustrating an example of a processing circuit included in the line-of-sight guidance device.

FIG. 3 is a diagram illustrating an example of a processing circuit included in the line-of-sight guidance device 100. The processing circuit includes a processor 91 and a memory 92. Each function of the vehicle peripheral state acquisition unit 10, the line-of-sight acquisition unit 20, and the display control unit 30 is realized by the processor 91 executing the program stored in the memory 92. For example, each function is realized by the processor 91 executing software or firmware described as a program. That is, the line-of-sight guidance device 100 includes the memory 92 that stores the program and the processor 91 that executes the program.

Described in the program are the functions in which the line-of-sight guidance device 100 acquires the information on the peripheral state of the vehicle, acquires the information on the line of sight of the driver driving the vehicle, and performs to control the two or more display devices included in the predetermined visual field in association with the line of sight among the plurality of display devices mounted on the vehicle, to display the line-of-sight guidance display that is a display for guiding the line of sight of the driver from the first attention target indicated by the line of sight to the second attention target associated with the peripheral state of the vehicle. The first attention target is an attention target actually watched by the driver. The second attention target is an attention target to be watched by the driver. And, the program causes the computer to execute the procedure or method of the vehicle peripheral state acquisition unit 10, the line-of-sight acquisition unit 20, and the display control unit 30.

The processor 91 is, for example, a central processing unit, a processing unit, an arithmetic unit, a microprocessor, a microcomputer, a Digital Signal Processor (DSP), or the like. The memory 92 corresponds to a nonvolatile or volatile semiconductor memory such as a Random Access Memory (RAM), a Read Only Memory (ROM), a flash memory, an Erasable Programmable Read Only Memory (EPROM), an Electrically Erasable Programmable Read Only Memory (EEPROM), and the like. Alternatively, a magnetic disk, a flexible disk, an optical disk, a compact disk, a minidisk, a Digital Versatile Disk (DVD), or any storage media used in the future may be applied to the memory 92.

Each function of the vehicle peripheral state acquisition unit 10, the line-of-sight acquisition unit 20, and the display control unit 30 described above may be partially implemented by dedicated hardware and the other may be implemented by software or firmware. As described above, the processing circuit can realize the functions described above by hardware, software, firmware, or a combination thereof.

Operation of Line-of-Sight Guidance Device and Line-of-Sight Guidance Method

Figure 4:
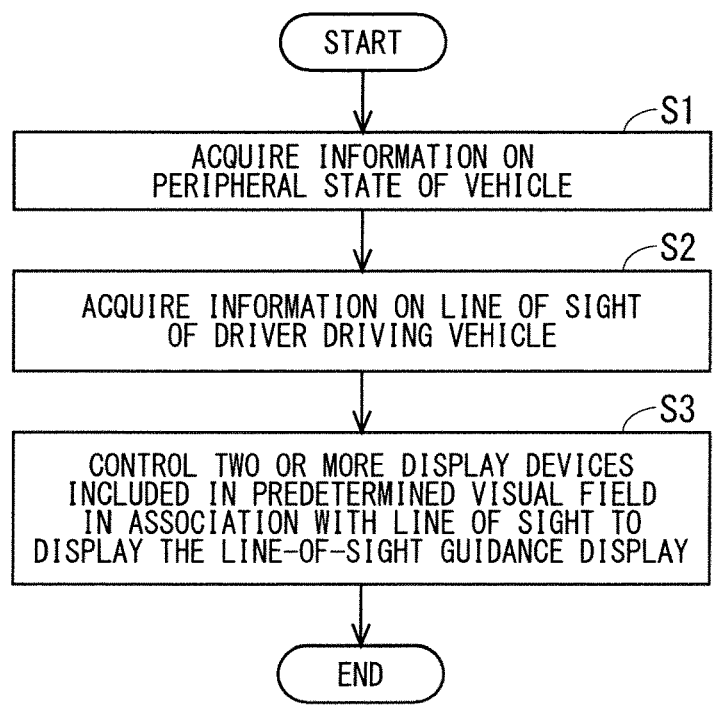
FIG. 4 A flowchart illustrating operation of the line-of-sight guidance device and a ling-of-sight guidance method according to Embodiment 1.

FIG. 4 is a flowchart illustrating the operation of the line-of-sight guidance device 100 and a ling-of-sight guidance method according to Embodiment 1.

In Step S1, the vehicle peripheral state acquisition unit 10 acquires information on the peripheral state of the vehicle.

In Step S2, the line-of-sight acquisition unit 20 acquires information on the line of sight of the driver driving the vehicle.

In Step S3, among the plurality of display devices, the display control unit 30 controls the two or more display devices to display the line-of-sight guidance display. The two or more display devices are included in the predetermined visual field in association with the line of sight of the driver.

Through the above Steps, the line-of-sight guidance display is displayed on the selected display devices.

Effect

In summary, the line-of-sight guidance device 100 according to Embodiment 1 includes the vehicle peripheral state acquisition unit 10 that acquires the information on the peripheral state of the vehicle; the line-of-sight acquisition unit 20 that acquires the information on the line-of-sight of the driver driving the vehicle; and the display control unit 30 that controls two or more display units included in the predetermined visual field in association with the line of sight among a plurality of display units mounted on the vehicle, to display the line-of-sight guidance display that is a display for guiding the line of sight of the driver from the first attention target indicated by the line of sight to the second attention target associated with the peripheral state of the vehicle. The first attention target is an attention target actually watched by the driver. The second attention target is an attention target to be watched by the driver. In Embodiment 1, the plurality of display units correspond to the plurality of display devices.

With such a configuration, the line-of-sight guidance device 100 can guide the line of sight of the driver to the attention target that the driver should look at with attention. The line-of-sight guidance display is displayed within the visual field visible to the driver; therefore, the driver can correctly recognize the direction that the driver should visually recognize. The line-of-sight guidance device 100 can reliably perform line-of-sight guidance. In addition, the line-of-sight guidance device 100 causes the display devices included in the predetermined visual field in association with the line of sight of the driver to display the line-of-sight guidance display. Not all the display devices are required to display the line-of-sight guidance display; therefore, improvement of the display processing speed and saving of the power consumption of the device is ensured.

A line-of-sight guidance method according to Embodiment 1 includes acquiring the information on the peripheral state of the vehicle; acquiring the information on the line of sight of the driver driving the vehicle; and performing to control the two or more display units included in the predetermined visual field in association with the line of sight among the plurality of display units mounted on the vehicle, to display the line-of-sight guidance display that is a display for guiding the line of sight of the driver from the first attention target indicated by the line of sight to the second attention target associated with the peripheral state of the vehicle. The first attention target is an attention target actually watched by the driver. The second attention target is an attention target to be watched by the driver. In Embodiment 1, the plurality of display units correspond to the plurality of display devices.

With such a configuration, according to the line-of-sight guidance method, the line of sight of the driver can be guided to the attention target that the driver should look at with attention. The line-of-sight guidance display is displayed within the visual field visible to the driver; therefore, the driver can correctly recognize the direction that the driver should visually recognize According to the line-of-sight guidance method, the line-of-sight guidance can be reliably performed. In addition, the line-of-sight guidance method causes a display device included in the predetermined visual field in association with the line of sight of the driver to display the line-of-sight guidance display. Not all the display devices are required to display the line-of-sight guidance display; therefore, the display processing speed and saving of the power consumption of the device are ensured.

Embodiment 2

A line-of-sight guidance device and a ling-of-sight guidance method according to Embodiment 2 will be described. Note that the description of the similar configuration and operation as in Embodiment 1 is omitted.

Configuration of Line-of-Sight Guidance Device

FIG. 5 is a block diagram illustrating a configuration of a line-of-sight guidance device 101 and devices that operate in association therewith according to Embodiment 2. The line-of-sight guidance device 101 includes a vehicle peripheral state acquisition unit 10, a line-of-sight acquisition unit 20, an attention degree calculation unit 40, and a display control unit 30. FIG. 5 illustrates a vehicle peripheral state detection device 110, a line-of-sight detection device 120, and a plurality of display devices as devices that operate in association with the line-of-sight guidance device 101. The plurality of display devices include the first display device 131 to the sixth display device 136. The vehicle peripheral state detection device 110, the line-of-sight detection device 120, and each display device are mounted on a vehicle (not shown).

The vehicle peripheral state detection device 110 detects a peripheral state of the vehicle. The vehicle peripheral state detection device 110 may detect the peripheral state of the vehicle in a constant manner. The vehicle peripheral state detection device 110 is, for example, a camera, a radar or a sensor.

The line-of-sight detection device 120 detects a line of sight of a driver driving the vehicle. The line-of-sight detection device 120 may detect the line of sight of the driver in a constant manner. The line-of-sight detection device 120 is, for example, an eye tracking device.

The vehicle peripheral state acquisition unit 10 acquires information on the peripheral state of the vehicle from the vehicle peripheral state detection device 110.

The attention degree calculation unit 40 calculates an attention degree of the peripheral state of the vehicle and determines whether or not a notification is needed for the driver based on the attention degree. The attention degree indicates degree that the driver should look at the peripheral state of the vehicle with attention. The attention degree calculation unit 40 calculates or determines the attention degree based on, for example, the relative positional relationship between the vehicle and the peripheral state of the vehicle or the like. The attention degree may be, for example, a danger level. When the peripheral state of the vehicle is an abnormal state that hinders the traveling of the vehicle, the attention degree calculation unit 40 calculates and determines the danger level based on the magnitude of the cause. The peripheral state of the vehicle that the attention degree calculation unit 40 has determined that a notification is needed for the driver, is the second attention target to be watched by the driver. For example, cause of the abnormal state is the second attention target.

The line-of-sight acquisition unit 20 acquires information on the line of sight of the driver from the line-of-sight detection device 120. The attention target indicated by the acquired line of sight is an attention target actually watched by the driver, and is the first attention target.

Based on the determination result of the attention degree calculation unit 40, the display control unit 30 controls two or more display devices among the plurality of display devices to display a line-of-sight guidance display for guiding the line of sight of the driver from the first attention target to the second attention target. At that time, based on the information on the line of sight of the driver acquired by the line-of-sight acquisition unit 20, the display control unit 30 selects the two or more display devices included in a predetermined visual field in association with the line of sight of the driver among the plurality of display devices. The predetermined visual field in association with the line of sight of the driver is, for example, an effective visual field. The effective visual field corresponds to the range in which the driver can clearly recognize the shape or color of an object. That is, in this case, the display control unit 30 selects display devices included in the visual field in which the driver can recognize the line-of-sight guidance display. The display control unit 30 controls the selected display devices to display the line-of-sight guidance display. In this manner, the display control unit 30 operates with information such as the relative position between the vehicle and the second attention target or the magnitude of the cause thereof being given.

Figure 6:
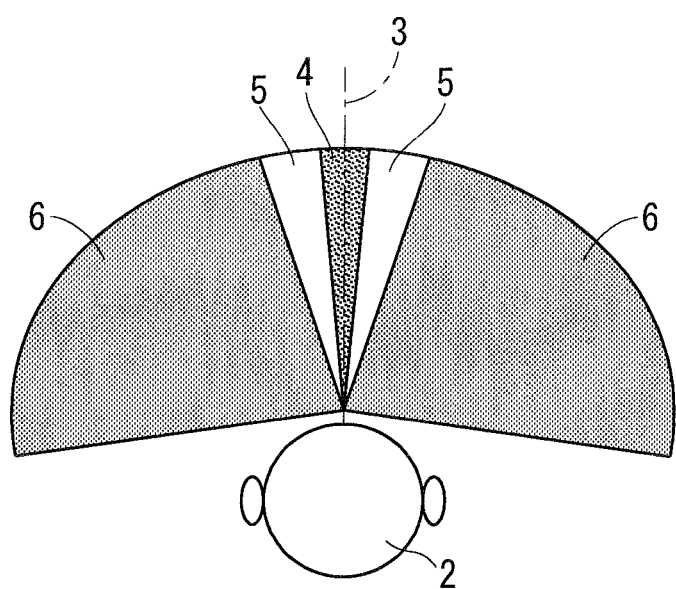
FIG. 6 A diagram illustrating line of sight of a driver and a visual field of the driver related to the line-of-sight.

FIG. 6 is a diagram illustrating the line of sight 3 of the driver 2 and a visual field of the driver 2 in association with the line of sight 3. The visual field of the driver 2 includes three visual fields of a central vision 4, an effective visual field 5, and a peripheral visual field 6. The three visual fields exist symmetrically with respect to the line of sight 3. The central vision 4 is a visual field in the range of 1 to 2 degrees around the line of sight 3. The first attention target and the second attention target correspond to the central vision 4. The effective visual field 5 is a visual field that exists outside the central vision 4 and extends up to about 20 degrees around the line of sight 3. The peripheral visual field 6 is a visual field that exists outside the effective visual field 5 and extends up to about 100 degrees around the line of sight 3. In the peripheral visual field 6, the driver 2 cannot clearly recognize the shape or color of the object.

FIG. 7 is a diagram illustrating a configuration of hardware of the line-of-sight guidance device 101 according to Embodiment 2. The processing circuit is connected to the vehicle peripheral state detection device 110, the line-of-sight detection device 120, and the plurality of display devices via an input/output interface 140. Further, the processing circuit including the processor and the memory realizes the function of the attention degree calculation unit 40 in addition to the functions described in Embodiment 1. That is, in the program stored in the memory 92 and executed by the processor 91, the function in which the line-of-sight guidance device 101 calculates the attention degree of the peripheral state of the vehicle, and determines whether or not the notification is needed for the driver based on the attention degree is described.

Figure 8:
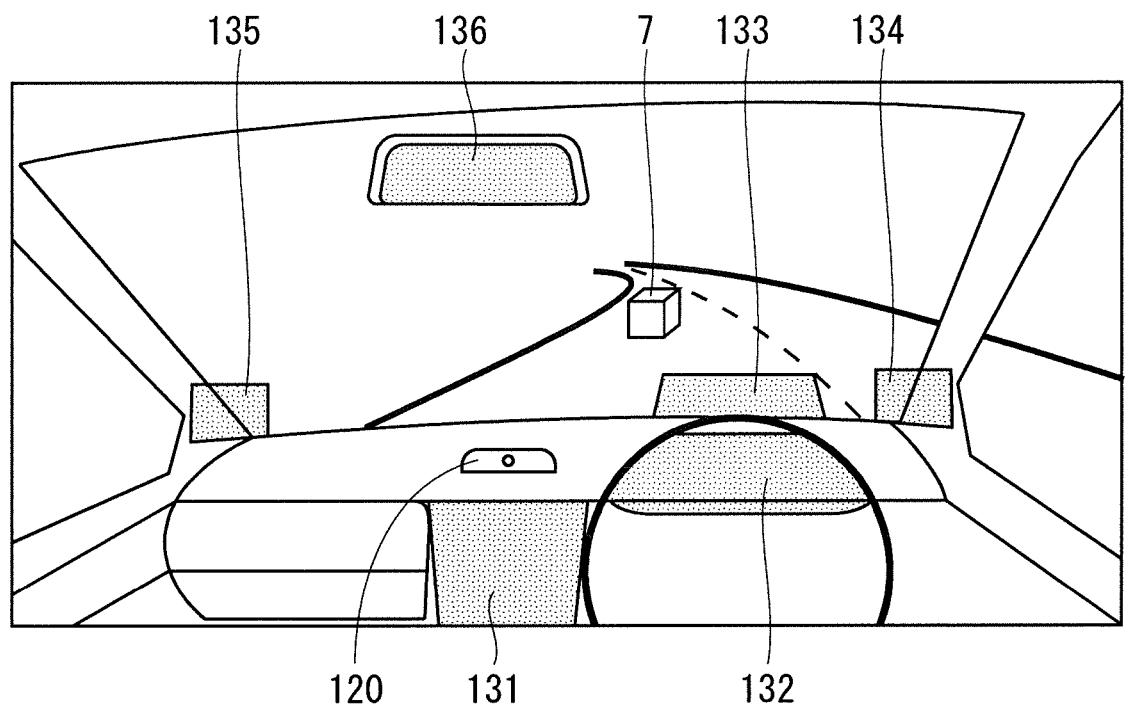
FIG. 8 A diagram illustrating a plurality of display devices mounted on a vehicle according to Embodiment 2.

FIG. 8 is a diagram illustrating the plurality of display devices mounted on the vehicle according to Embodiment 2. The first display device 131 is an infotainment device. The second display device 132 is an electronic meter cluster in which small display units are clustered. The third display device 133 is a head-up display. The fourth display device 134 and the fifth display device 135 are electronic side mirrors. The sixth display device 136 is an electronic rearview mirror.

Operation of Line-of-Sight Guidance Device and Line-of-Sight Guidance Method

Figure 9:
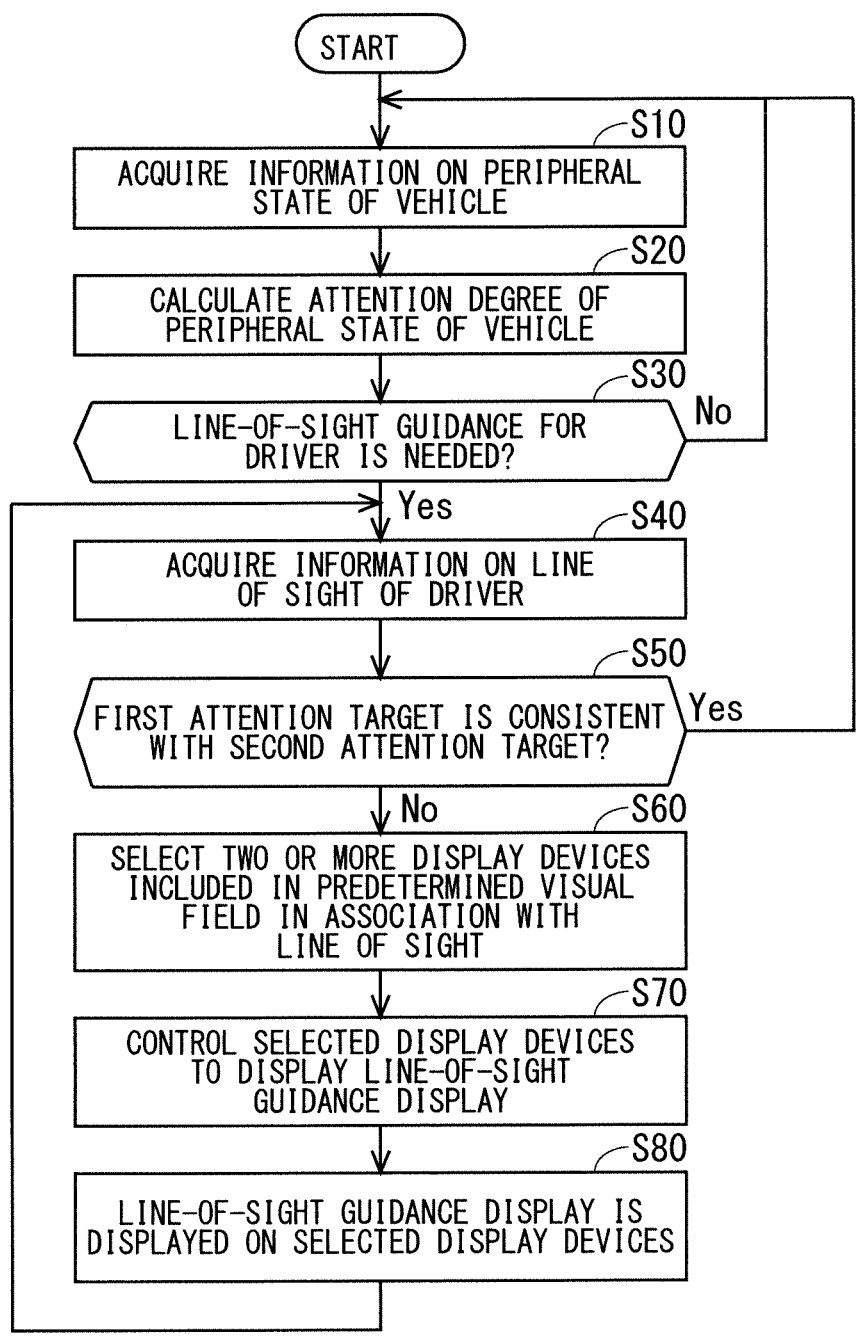
FIG. 9 A flowchart illustrating operation of the line-of-sight guidance device and a ling-of-sight guidance method according to Embodiment 2.

FIG. 9 is a flowchart illustrating the operation of the line-of-sight guidance device 101 and the ling-of-sight guidance method according to Embodiment 2.

In Step S10, the vehicle peripheral state acquisition unit 10 acquires the information on the peripheral state of the vehicle from the vehicle peripheral state detection device 110. Here, as illustrated in FIG. 8, there is an abnormal state on the road ahead of the vehicle, which is caused by an obstacle 7 that interferes with the traveling of the vehicle. The vehicle peripheral state acquisition unit 10 acquires information on the obstacle 7 and a location thereof as information on the peripheral state of the vehicle.

In Step S20, the attention degree calculation unit 40 calculates the attention degree of the peripheral state of the vehicle. Here, the attention degree calculation unit 40 calculates the danger level associated with the obstacle 7 as the attention degree.

In Step S30, the attention degree calculation unit 40 determines whether or not a line-of-sight guidance for the driver is needed based on the level of the attention degree. In other words, the attention degree calculation unit 40 determines whether or not the cause of the acquired peripheral state of the vehicle is the second attention target to be watched by the driver. Here, the attention degree calculation unit 40 determines whether or not the line-of-sight guidance for the driver is needed based on the level of the danger level of the obstacle 7. When it is determined that the line-of-sight guidance is needed, Step S40 is executed. When it is determined that the line-of-sight guidance is not needed, Step S10 is re-executed.

In Step S40, the line-of-sight acquisition unit 20 acquires the information on the line of sight of the driver from the line-of-sight detection device 120. The target indicated by the acquired line of sight is the first attention target.

Figure 10:
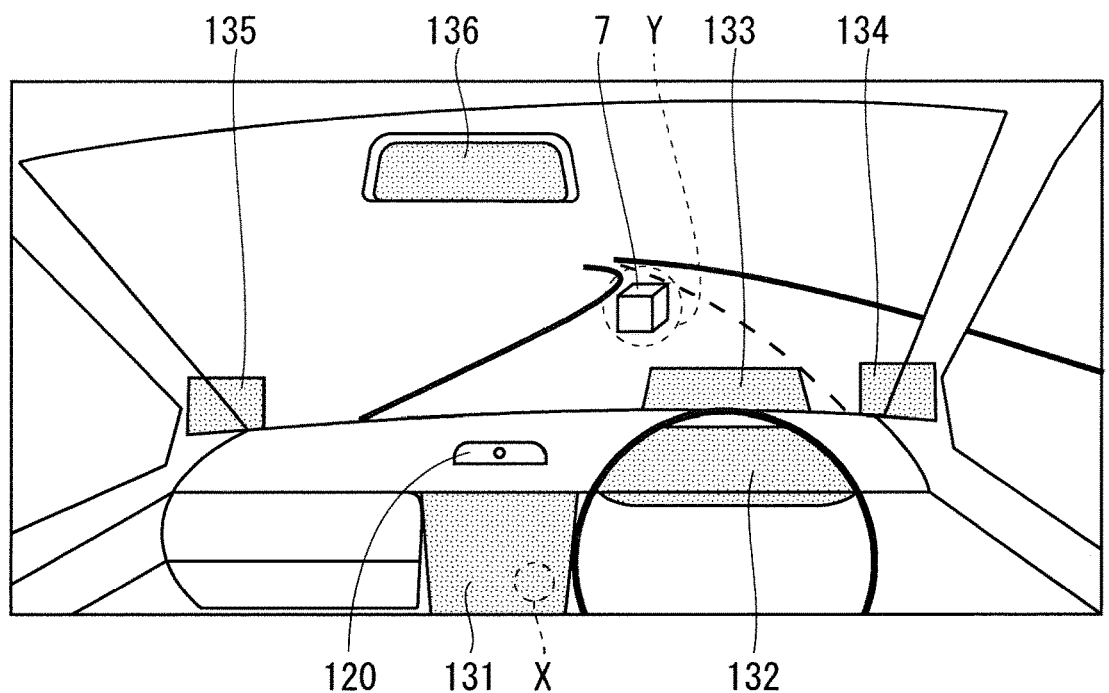
FIG. 10 A diagram illustrating an example of the first attention target and the second attention target according to Embodiment 2.

In Step S50, the display control unit 30 determines whether or not the first attention target is consistent with the second attention target. When inconsistency is determined, Step S60 is executed. When consistency is determined, Step S10 is re-executed. FIG. 10 is a diagram illustrating an example of the first attention target X and the second attention target Y. Here, the first attention target X is located in the second display device 132. The second attention target Y is located where the obstacle 7 exists.

In Step S60, among the plurality of display devices, the display control unit 30 selects two or more display devices included in the predetermined visual field in association with the line of sight of the driver. Here, the display control unit 30 selects the first display device 131 included in the central vision 4, the second display device 132 and the third display device 133 included in the effective visual field 5. With such a selection method, among the plurality of display devices, the display control unit 30 can select the first display device 131 closest to the first attention target X, the second display device 132 and the third display device 133 located around the first display device 131.

Figure 11:
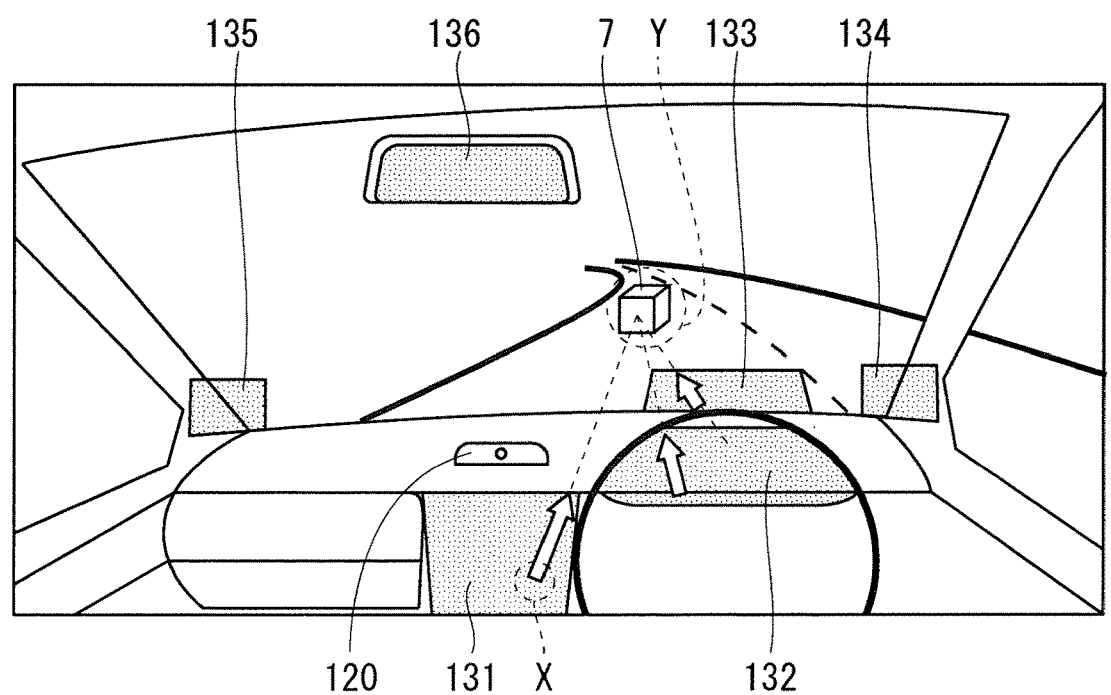
FIG. 11 A diagram illustrating an example of a line-of-sight guidance display according to Embodiment 2.

In Step S70, the display control unit 30 controls the selected display devices to display the line-of-sight guidance display. FIG. 11 is a diagram illustrating an example of the line-of-sight guidance display. Here, the display control unit 30 controls each display device to display an arrow indicating a direction from each display device toward the second attention target Y.

In Step S80, the selected display devices display the line-of-sight guidance display. Here, the first display device 131, the second display device 132, and the third display device 133 display the line-of-sight guidance display. Accordingly, the line of sight of the driver is guided.

Thereafter, Step S40 is re-executed. In Step S40 to be re-executed, the line of sight acquired by the line-of-sight acquisition unit 20 is the latest line of sight of the driver. The first attention target indicated by the line of sight is the latest attention target actually watched by the driver. In subsequent Steps, based on the latest attention target, the display control unit 30 reselects display devices for displaying the line-of-sight guidance display. Then, the line-of-sight guidance display is displayed on the display devices selected according to the latest attention target.

Embodiment 3

A line-of-sight guidance device and a ling-of-sight guidance method according to Embodiment 3 will be described. Note that the description of the similar configurations and operations as in Embodiment 1 or 2 is omitted.

The display control unit 30 in Embodiment 3 controls two or more display devices to display the line-of-sight guidance display in cooperation with each other. The two or more display devices are included in the predetermined visual field in association with the line of sight of the driver.

The display control unit 30 causes each display device to display the line-of-sight guidance display at different timings, for example. The display control unit 30 controls the display devices to display the line-of-sight guidance display in an order from the device having the longest distance to the second attention target Y. Also, for example, the display control unit 30 controls the display devices to display the line-of-sight guidance display in an order from the device close to the first attention target X to the device close to the second attention target Y.

The line-of-sight guidance display displayed in cooperation with each display device includes, for example, characters, or a moving image in which figures, or symbols are used. The line-of-sight guidance display includes, for example, an animation using an icon or the like.

With such a configuration, the line-of-sight guidance device can effectively guide the line of sight of the driver.

Embodiment 4

A line-of-sight guidance device and a ling-of-sight guidance method according to Embodiment 4 will be described. Note that the description of the similar configurations and operations as in any of Embodiments 1 to 3 is omitted.

As the two or more display devices included in the predetermined visual field in association with the line of sight of the driver, the display control unit 30 selects the display device closest to the first attention target X and the display device closest to a straight line extending in the direction connecting the first attention target X and the second attention target Y.

Figure 12:
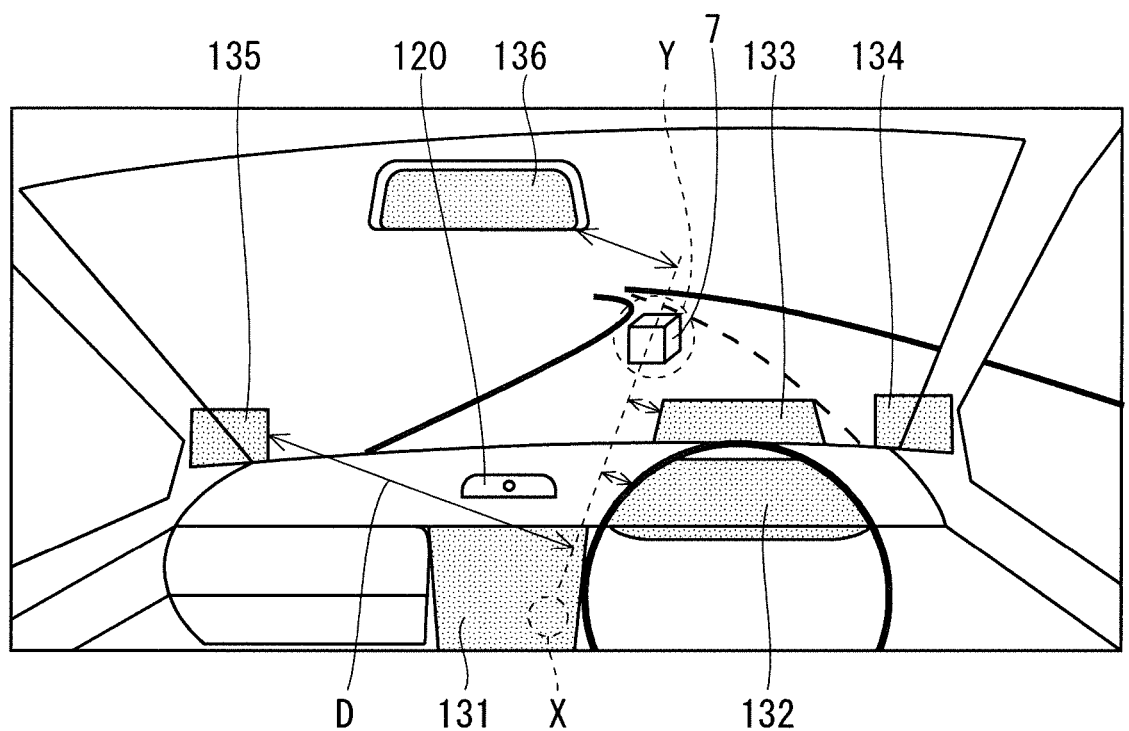
FIG. 12 A diagram illustrating an example of a selection method of display devices for displaying a line-of-sight guidance display according to Embodiment 4.

FIG. 12 is a diagram illustrating an example of a selection method of the display devices for displaying the line-of-sight guidance display according to Embodiment 4. The display device closest to the first attention target X is the first display device 131. The display device closest to the straight line extending in the direction connecting the first attention target X and the second attention target Y is the second display device 132 or the third display device 133. Therefore, the display control unit 30 causes the first display device 131 and the second display device 132, or the first display device 131 and the third display device 133 to display the line-of-sight guidance display.

The control by the display control unit 30 described above is performed in Step S60 of the flowchart illustrated in FIG. 9. That is, in Step S60, as the two or more display devices included in the predetermined visual field in association with the line of sight of the driver, the display control unit 30 selects the display device closest to the first attention target X and the display device closest to the extending straight line connecting the first attention target X and the second attention target Y.

With such a configuration, the line-of-sight guidance device can display the line-of-sight guidance display close to a region the driver is actually looking at with attention.

Embodiment 5

A line-of-sight guidance device and a ling-of-sight guidance method according to Embodiment 5 will be described. Note that the description of the similar configurations and operations as in any of Embodiments 1 to 4 is omitted.

As the two or more display devices included in the predetermined visual field in association with the line of sight of the driver, the display control unit 30 selects the display device closest to the first attention target X and a display device located within a predetermined distance D from the extending straight line connecting the first attention target X and the second attention target Y. As illustrated in FIG. 12, the distance D between the straight line and each display device is determined by the normal line to the straight line.

The control by the display control unit 30 described above is performed in Step S60 of the flowchart illustrated in FIG. 9. That is, in Step S60, as the two or more display devices included in the predetermined visual field in association with the line of sight of the driver, the display control unit 30 selects the display device closest to the first attention target X and the display device located within the predetermined distance D from the extending straight line connecting the first attention target X and the second attention target Y.

With such a configuration, the line-of-sight guidance device can display the line-of-sight guidance display close to a region the driver is actually looking at with attention.

Also, the display control unit 30 may correct the predetermined distance D according to the distance between the first attention target X and the driver.

With such a configuration, the line-of-sight guidance device can cause the display devices included in the effective visual field 5 of the driver to display the line-of-sight guidance display.

Embodiment 6

A line-of-sight guidance device and a ling-of-sight guidance method according to Embodiment 6 will be described. Note that the description of the similar configurations and operations as in any of Embodiments 1 to 5 is omitted.

Based on the positional relationship between the first attention target X and the second attention target Y, the display control unit 30 determines the number of two or more display devices included in the predetermined visual field in association with the line of sight of the driver. Particularly, after the line-of-sight guidance device once displays the line-of-sight guidance display, and when the line of sight of the driver has not yet reached the second attention target Y, the display control unit 30 increases the number of display devices and selects the same.

Figure 13:
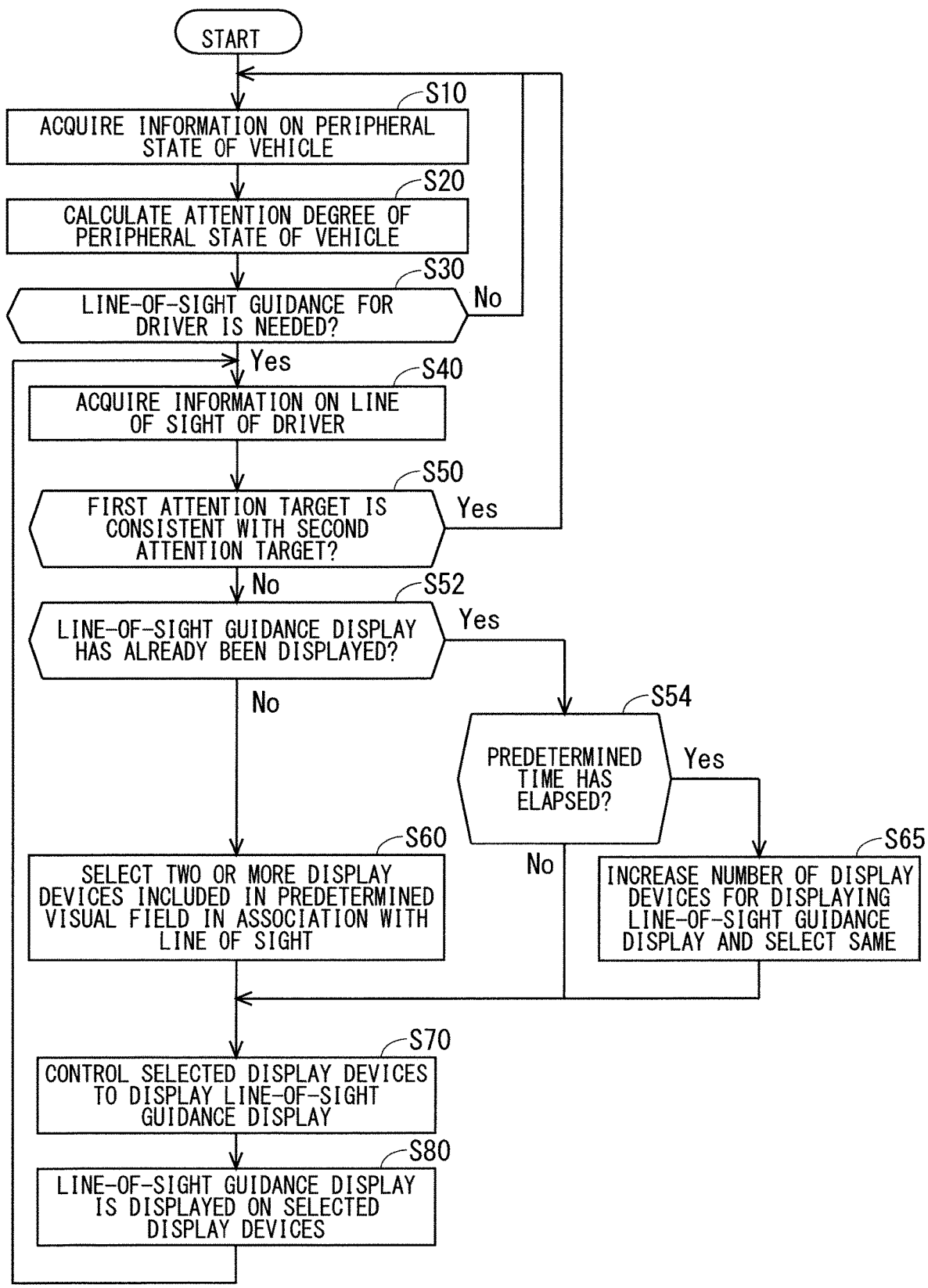
FIG. 13 A flowchart illustrating operation of a line-of-sight guidance device and a ling-of-sight guidance method according to Embodiment 6.

FIG. 13 is a flowchart illustrating operation of the line-of-sight guidance device and the ling-of-sight guidance method according to Embodiment 6.

Steps up to Step S50 are the same as those in FIG. 9 illustrated in Embodiment 2.

In Step S52, the display control unit 30 determines whether or not the control of displaying the line-of-sight guidance display has already been performed. When it is determined that the control has not yet been performed, Step S60 is executed. From Step S60 onward, Steps are the same as those in Embodiment 2. When it is determined that the control has been performed, Step S54 is executed.

In Step S54, the display control unit 30 determines whether or not a predetermined time has elapsed since the control of displaying the line-of-sight guidance display has been performed. When it is determined that the predetermined time has elapsed, Step S65 is executed. When it is determined that the predetermined time has not elapsed, Step S60 is executed.

In Step S65, the display control unit 30 increases the number of display devices for displaying the line-of-sight guidance display and selects the same.

From Step S70 onward, Steps are the same as those in Embodiment 2. It should be noted that when the predetermined time has not elapsed in Step S54, the display control unit 30 causes the display devices that has already been selected to display the line-of-sight guidance display in Step S70.

With such a configuration, the line-of-sight guidance method enhances the effect of the line-of-sight guidance.

Embodiment 7

A line-of-sight guidance device and a ling-of-sight guidance method according to Embodiment 7 will be described. Note that the description of the similar configurations and operations as in any of Embodiments 1 to 6 is omitted.

When the first attention target X does not reach the second attention target Y within the predetermined time since the line-of-sight guidance display has been displayed, the display control unit 30 performs the control to cause two or more display devices including the display device closest to the latest attention target of the driver to display the line-of-sight guidance display. That is, the display control unit 30 reselects the display devices.

Figure 14:
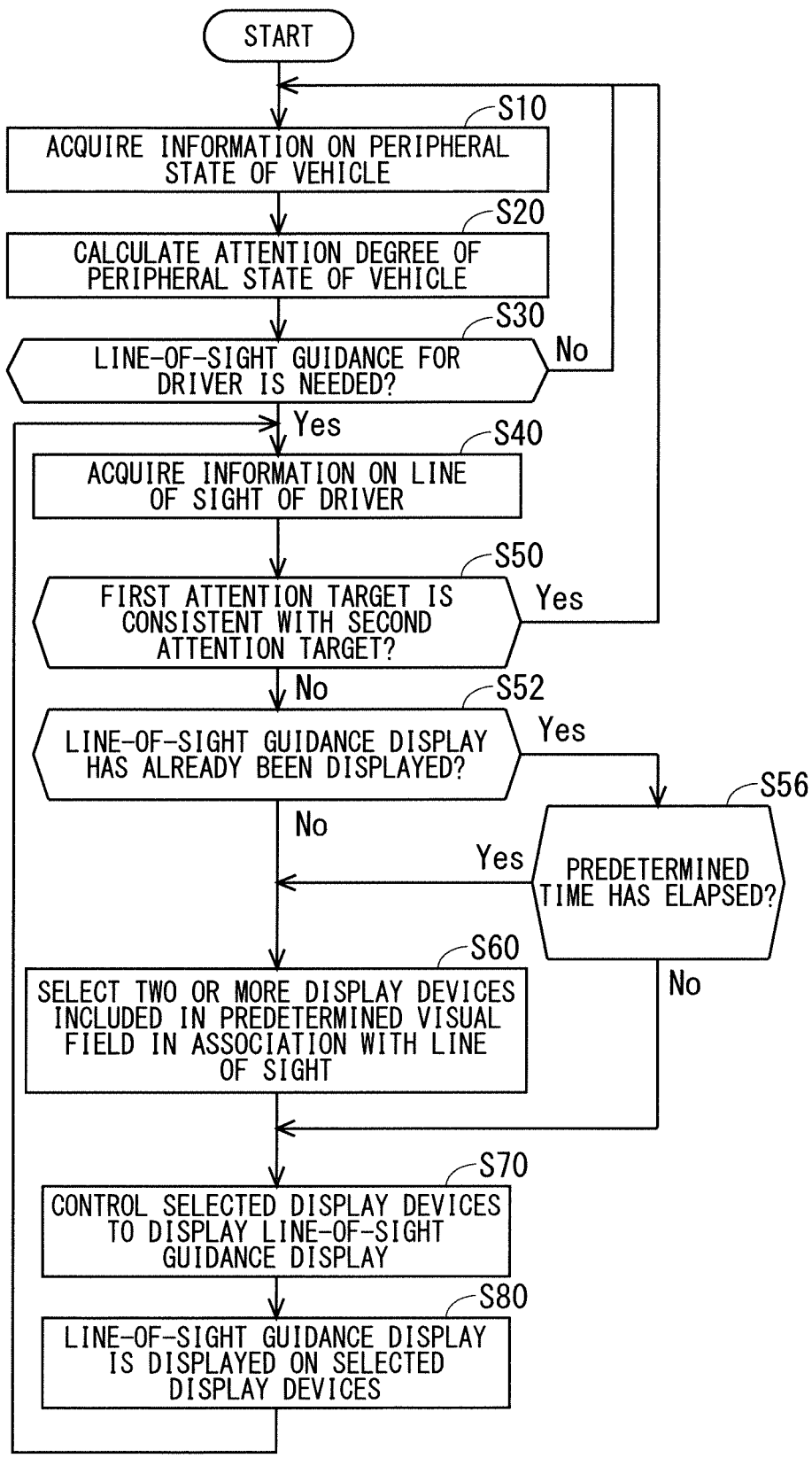
FIG. 14 A flowchart illustrating operation of a line-of-sight guidance device and a ling-of-sight guidance method according to Embodiment 7.

FIG. 14 is a flowchart illustrating operation of the line-of-sight guidance device and the ling-of-sight guidance method according to Embodiment 7.

Steps up to Step S52 are the same as those in FIG. 13 illustrated in Embodiment 6. However, when it is determined that the control has been performed, Step S56 is executed.

In Step S56, the display control unit 30 determines whether or not the predetermined time has elapsed since the control of displaying the line-of-sight guidance display has been performed. When it is determined that the predetermined time has elapsed, Step S60 is executed. When it is determined that the predetermined time has not elapsed, Step S70 is executed.

In Step S60, the display control unit 30 selects the two or more display devices including the display device closest to the latest attention target of the driver acquired in Step S40.

From Step S70 onward, Steps are the same as those in Embodiment 2. It should be noted that when the predetermined time has not elapsed in Step S56, the display control unit 30 causes the display devices that has already been selected to display the line-of-sight guidance display in Step S70.

With such a configuration, the line-of-sight guidance method enhances the effect of the line-of-sight guidance.

Modification of Embodiment 7

In Modification of Embodiment 7, when the first attention target X does not reach the second attention target Y within the predetermined time since the line-of-sight guidance display has been displayed, the display control unit 30 performs the control to cause two or more display devices including the display device closest to the latest attention target and the display device closest to an extending straight line connecting the latest attention target and the second attention target Y to display the line-of-sight guidance display.

Regarding such control, in Step S60 illustrated in FIG. 14, the display control unit 30 selects the two or more display devices including the display device closest to the latest attention target and the display device closest to the extending straight line connecting the latest attention target and the second attention target Y.

Further, as another Modification, when the first attention target X does not reach the second attention target Y within the predetermined time since the line-of-sight guidance display has been displayed, the display control unit 30 may perform the control to cause two or more display devices including the display device closest to the latest attention target and the display device located within the predetermined distance D from the extending straight line connecting the latest attention target and the second attention target Y to display the line-of-sight guidance display.

Regarding such control, in Step S60, the display control unit 30 selects the two or more display devices including the display device closest to the latest attention target and the display device located within the predetermined distance D from the extending straight line connecting the latest attention target and the second attention target Y.

With such a configuration, the line-of-sight guidance method enhances the effect of the line-of-sight guidance.

Also, the display control unit 30 may correct the predetermined distance D according to the distance between the latest attention target and the driver.

With such a configuration, the line-of-sight guidance method can cause the display devices included in the effective visual field 5 of the driver to display the line-of-sight guidance display.

Embodiment 8

A line-of-sight guidance device and a ling-of-sight guidance method according to Embodiment 8 will be described. Note that the description of the similar configurations and operations as in any of Embodiments 1 to 7 is omitted.

The display control unit 30 changes the emphasis degree of the line-of-sight guidance display and causes the display device to display thereof. The degree of emphasis is changed according to the distance between the second attention target Y and the display device on which the line-of-sight guidance display is displayed. The display control unit 30 changes the degree of emphasis according to the distance between a position where the second attention target Y is projected on a plane orthogonal to the traveling direction of the vehicle and each position where each display device on which the line-of-sight guidance display is displayed is projected. The degree of emphasis is, for example, the size, length, or direction of the icon included in the line-of-sight guidance display displayed on the display device.

In FIG. 12, the plane orthogonal to the traveling direction of the vehicle is located in the windshield. Of the first display device 131, the second display device 132, and the third display device 133 that display the line-of-sight guidance display, the display device closest to the second attention target Y is the third display device 133. Also, the display device furthest from the second attention target Y is the first display device 131. The display control unit 30 causes the arrow having a longer length to be displayed as the line-of-sight guidance display as the distance between the display device and the second attention target Y increases.

With such a configuration, the line-of-sight guidance device can guide the line of sight of the driver to the attention target that the driver should look at with attention. The line-of-sight guidance device enhances the effect of the line-of-sight guidance.

Embodiment 9

A line-of-sight guidance device and a ling-of-sight guidance method according to Embodiment 9 will be described. Note that the description of the similar configurations and operations as in any of Embodiments 1 to 8 is omitted.

When the first attention target X does not reach the second attention target Y within the predetermined time since the line-of-sight guidance display has been displayed, the display control unit 30 performs the control to cause a display device for the passenger seat or the rear seat to display the line-of-sight guidance display.

With such a configuration, the line-of-sight guidance device notifies the second attention target Y that the movement of the line of sight of the driver has not been obtained. Further, the line-of-sight guidance device ensures the intuitive presentation of the second attention target Y for another occupant. When the danger is notified by sound, the second attention target Y is not obvious to the other occupant. The other occupant has to find out the second attention target Y after realizing that the driver is not responding to the second attention target Y. According to the line-of-sight guidance device described in Embodiment 9, the other occupant can grasp where the second attention target Y is at the point when the other occupant recognizes that the driver is not aware of the second attention target Y, enabling swift response thereto.

Embodiment 10

A line-of-sight guidance device and a ling-of-sight guidance method according to Embodiment 10 will be described. Note that the description of the similar configurations and operations as in any of Embodiments 1 to 9 is omitted.

Figure 15:
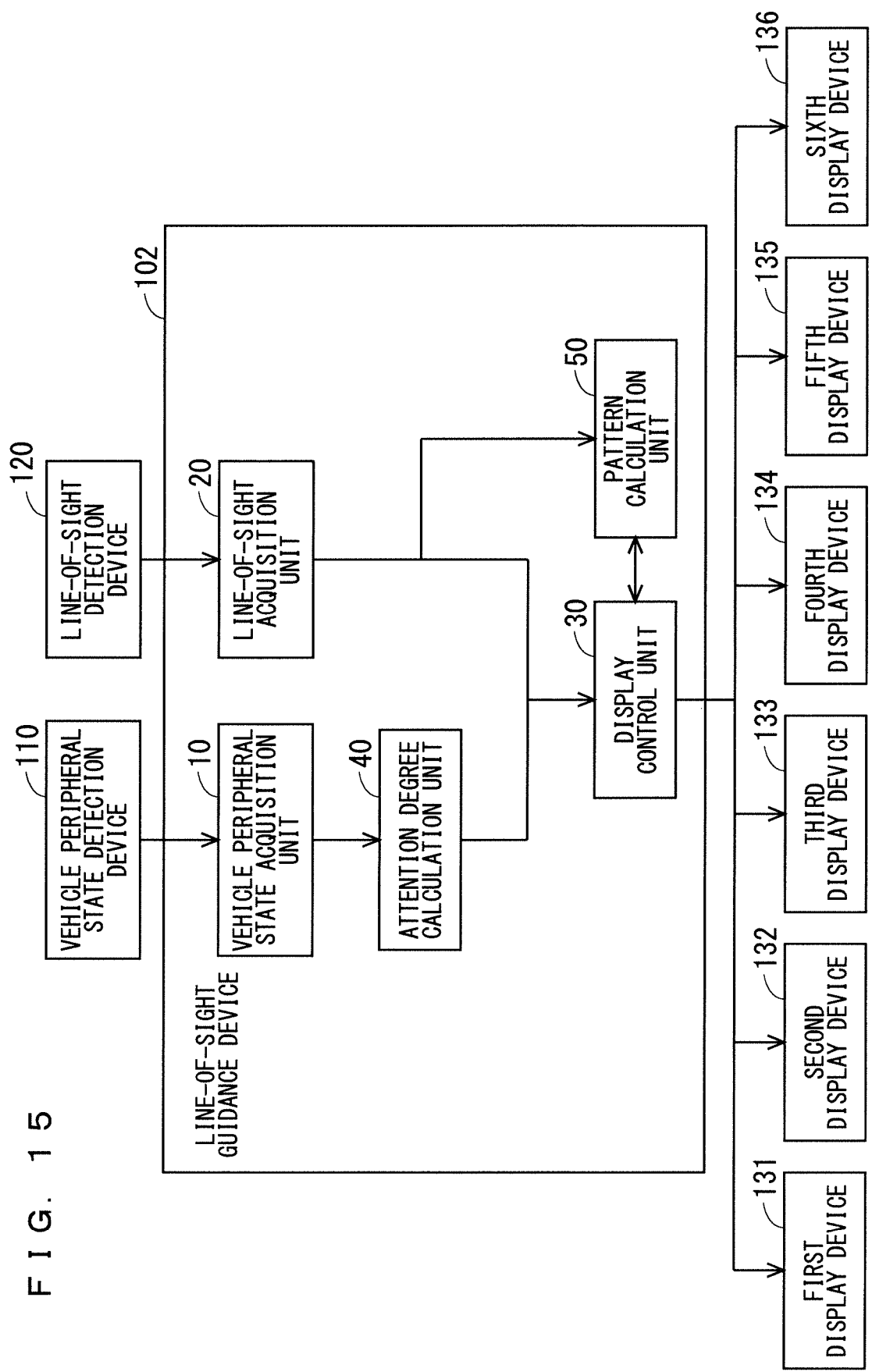
FIG. 15 A block diagram illustrating a configuration of a line-of-sight guidance device and devices that operate in association therewith according to Embodiment 10.

FIG. 15 is a block diagram illustrating a configuration of the line-of-sight guidance device 102 and devices that operate in association therewith according to Embodiment 10.

the line-of-sight guidance device 102 further includes a pattern calculation unit 50.

Based on the information on lines of sight of drivers, the pattern calculation unit 50 learns movement patterns of the lines of sight and predicts the movement destination of the line of sight. The pattern calculation unit 50 acquires the information on the line of sight of the driver from the line-of-sight acquisition unit 20 and the line-of-sight detection device 120 on a constant manner. Thereby, the pattern calculation unit 50 can accumulate and learn the movement patterns of the lines of sight. When the display control unit 30 selects the display devices for displaying the line-of-sight guidance display, the pattern calculation unit 50 outputs the predicted movement destination of the line of sight to the display control unit 30.

The display control unit 30 determines a priority order of the two or more display devices for displaying the line-of-sight guidance display according to the movement destination of the line of sight predicted by the pattern calculation unit 50.

The hardware configuration of the line-of-sight guidance device 102 in Embodiment 10 is similar to the configuration illustrated in FIG. 7 in Embodiment 2. The processing circuit configured by the processor 91 and the memory 92 realizes the function of the pattern calculation unit 50. That is, described in the program stored in the memory 92 and executed by the processor 91 is the function in which the line-of-sight guidance device 102 learns the movement patterns of the lines of sight based on the information on the lines of sight of the drivers, predicts the movement destination of the line of sight, and determines the priority order of the two or more display devices for displaying the lines-of-sight guidance display according to the predicted movement destination of the line of sight.

Figure 16:
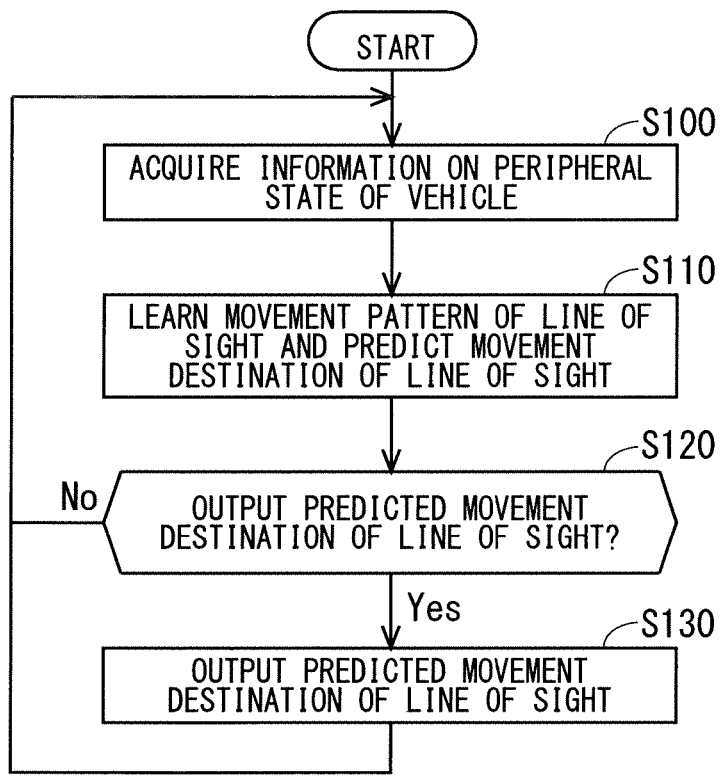
FIG. 16 A flowchart illustrating a method of learning a movement pattern of the line-of-sight according to Embodiment 10.

FIG. 16 is a flowchart illustrating a method of learning the movement pattern of the line of sight according to Embodiment 10.

In Step S100, the line-of-sight acquisition unit 20 acquires the information on the line of sight of the driver from the line-of-sight detection device 120. Here, the line-of-sight acquisition unit 20 acquires information on the lines of sight based on the lines of sight of the driver detected by the line-of-sight detection device 120 on a constant manner.

In Step S110, based on the information on the lines of sight of the driver acquired by the line-of-sight acquisition unit 20, the pattern calculation unit 50 learns the movement patterns of the lines of sight and predicts the movement destination of the line of sight.

In Step S120, the pattern calculation unit 50 determines whether to output the predicted movement destination of the line of sight to the display control unit 30. When it is determined to output, Step S130 is executed. For example, when a command is received from the display control unit 30, the pattern calculation unit 50 determines to output the predicted movement destination of the line of sight. When it is determined not to output, Step S100 is re-executed.

In Step S130, the pattern calculation unit 50 outputs the predicted movement destination of the line of sight to the display control unit 30.

Figure 17:
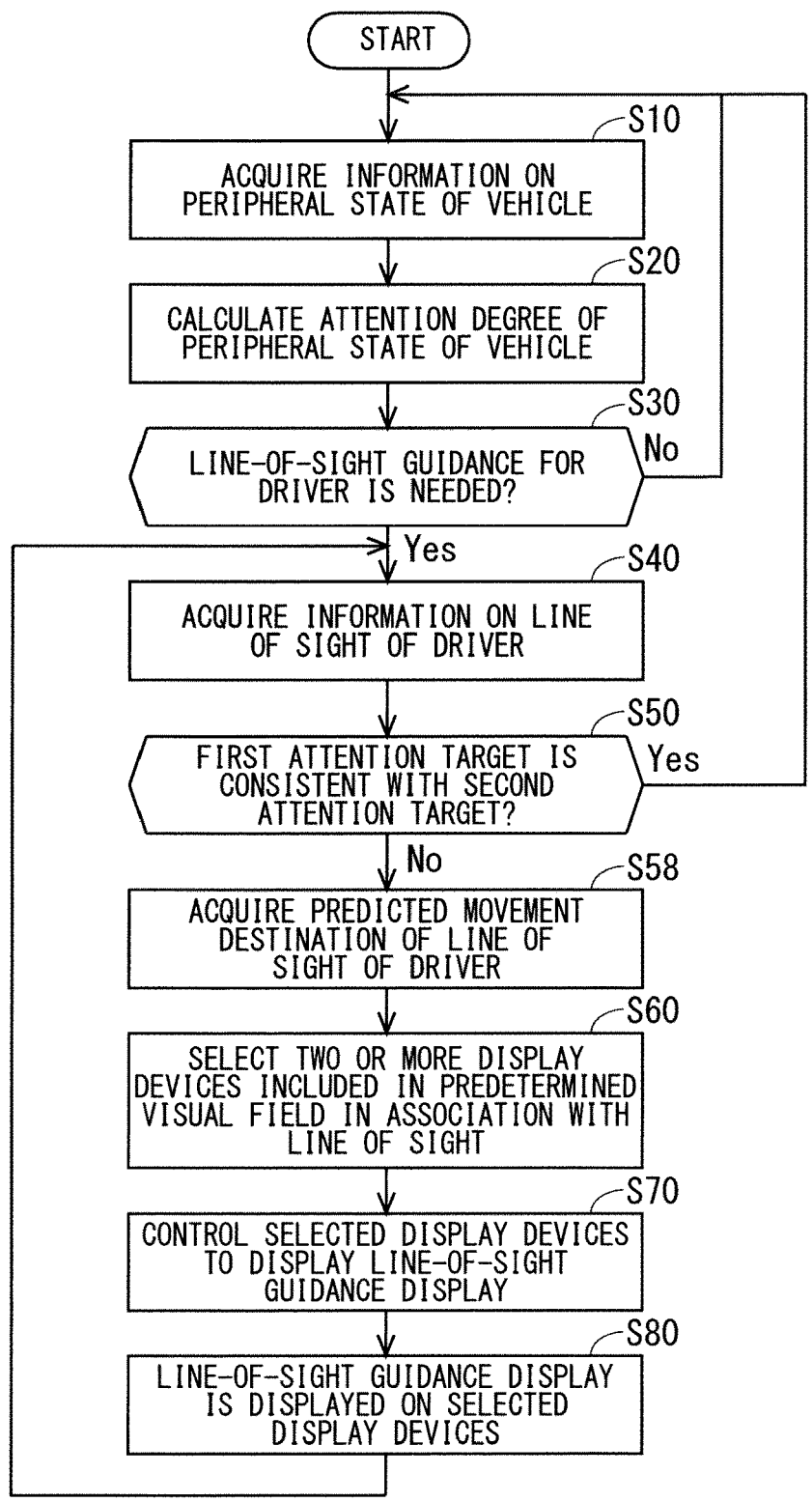
FIG. 17 A flowchart illustrating operation of a line-of-sight guidance device and a ling-of-sight guidance method according to Embodiment 10.

FIG. 17 is a flowchart illustrating the operation of the line-of-sight guidance device 102 and the ling-of-sight guidance method according to Embodiment 10.

Steps up to Step S50 are the same as each Step in FIG. 9 illustrated in Embodiment 2. However, in Step S50, when it is determined that the first attention target is not consistent with the second attention target, Step S58 is executed.

In Step S58, the display control unit 30 acquires the predicted movement destination of the line of sight of the driver from the pattern calculation unit 50. At this time, for example, the display control unit 30 acquires the movement destination of the line of sight by sending the command to the pattern calculation unit 50 to output the predicted movement destination of the line of sight.

In Step S60, the display control unit 30 determines the priority order of the two or more display devices for displaying the line-of-sight guidance display according to the predicted movement destination of the line of sight. The display control unit 30 selects the two or more display devices included in the predetermined visual field in association with the line of sight of the driver based on the priority order.

From Step S70 onward, Steps are the same as those in Embodiment 2.

With such a configuration, the line-of-sight guidance device 102 can change the priority order of the display device for displaying the line-of-sight guidance display according to the movement destination of the line of sight. The line-of-sight guidance device 102 can effectively guide the line of sight according to the characteristic of the line of sight of the driver.

Embodiment 11

A line-of-sight guidance device and a ling-of-sight guidance method according to Embodiment 11 will be described. Note that the description of the similar configurations and operations as in any of Embodiments 1 to 10 is omitted.

Figure 18:
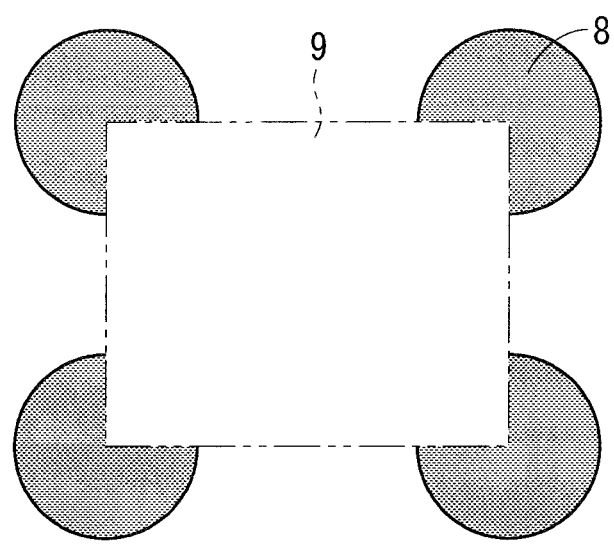
FIG. 18 A diagram illustrating an example of visual completion.
Figure 19:
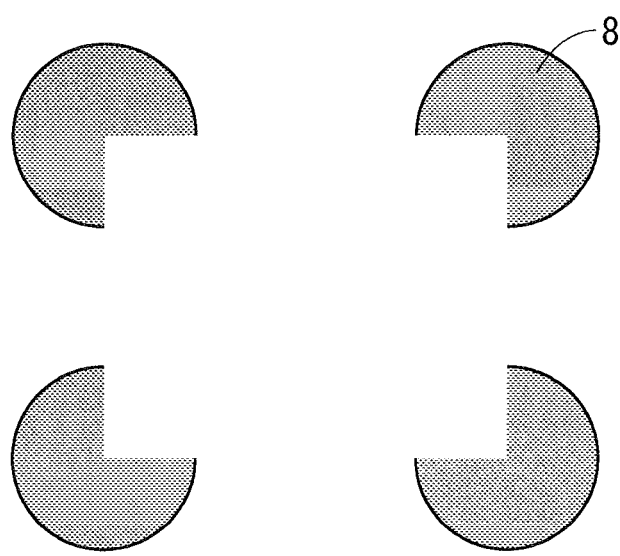
FIG. 19 A diagram illustrating an example of visual completion.

FIG. 18 and FIG. 19 are diagrams illustrating examples of visual completion. In FIG. 18, four circles 8 and one rectangle 9 are drawn. Each of the four circles 8 has a shape in which a fan shape portion missing therefrom. The rectangle 9 has the center of each fan shape as an apex. The contour of the rectangle 9 is drawn with a two-dot chain line. On the other hand, in FIG. 19, the contour of the rectangle 9 is not drawn with a line. Nevertheless, humans recognize a part of the contour of the rectangle 9 between each circle 8. For example, humans recognize that the rectangle 9 having the center of each fan shape as an apex overlaps the four circles 8. As described above, it is known that complementation works for the recognition of information obtained from human vision. This is called visual completion, subjective contour or illusion.

In Embodiment 11, the characteristic of visual completion is utilized. The line-of-sight guidance device causes the display devices to display a line-of-sight guidance display including a plurality of figures such that the contour of a predetermined overall figure can be recognized by visual completion among the plurality of display devices. Each figure constitutes a part of the overall figure. On each of the two or more display devices included in the predetermined visual field in association with the line of sight of the driver, the one figure constitutes a part of the overall figure is displayed. The overall figure is a figure indicating the direction from the first attention target X toward the second attention target Y.

Among the plurality of display devices, the display control unit 30 controls each of the two or more display devices to display each figure. At this time, between the second attention target Y and the first attention target X, and between the second attention target Y and each of the two or more display devices, the display control unit 30 controls to display each figure such that the contour of the overall figure is recognized by visual completion. Note that, not all the figures are required to be displayed on the display devices included in the effective visual field of the driver. At least the display device closest to the first attention target displays one of the plurality of figures.

Figure 20:
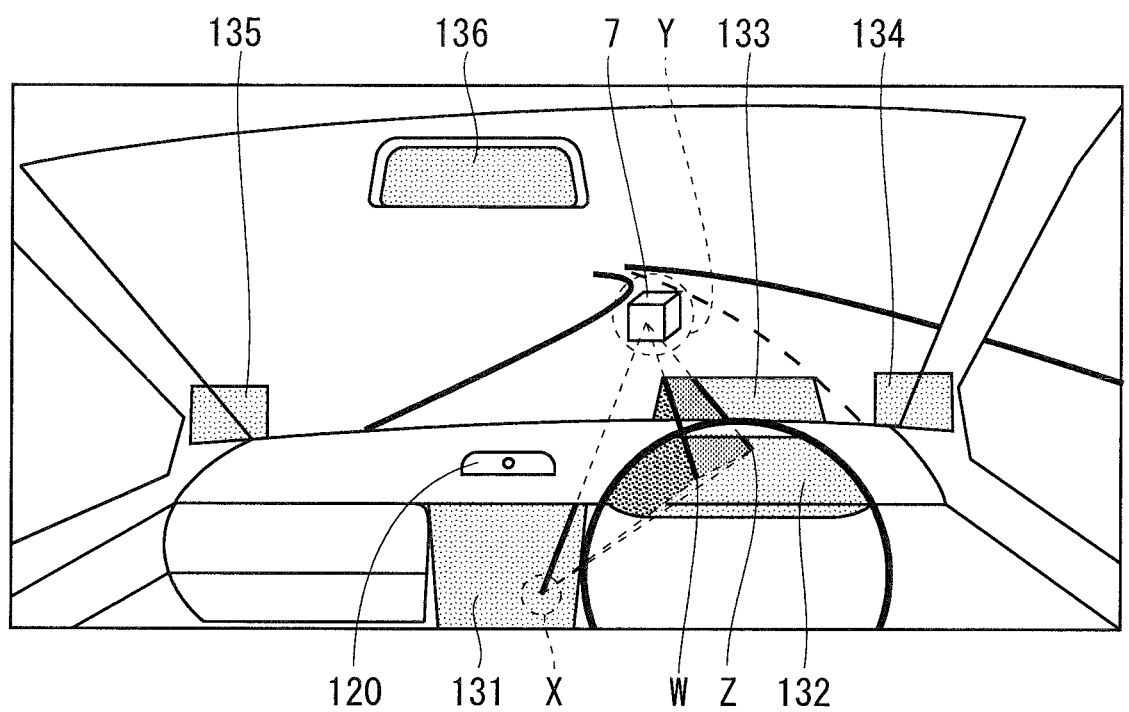
FIG. 20 A diagram illustrating an example of a line-of-sight guidance display according to Embodiment 11.

FIG. 20 is a diagram illustrating an example of the line-of-sight guidance display according to Embodiment 11. The overall figure indicating the direction from the first attention target X toward the second attention target Y is a trigonal pyramid. One of the four apexes of the trigonal pyramid is included in the first attention target X. That is, the apex is located in the first display device 131. Another apex is included in the second attention target Y. That is, the apex is located at the obstacle 7. The other two apexes W and Z are located in any display device, but here, the apexes W and Z are located in the second display device 132.

The first display device 131, the second display device 132, and the third display device 133 each display a figure forming a part of the trigonal pyramid that is the overall figure.

The display control unit 30 displays each figure such that the contour of the trigonal pyramid, that is the overall figure, can be recognized by visual completion. The contour of the trigonal pyramid is recognized between the second attention target Y and the first attention target X. Similarly, the contour of the trigonal pyramid is also recognized between the second attention target Y and each of the two apexes W and Z located in the second display device 132. The shape of the overall figure is not limited to the trigonal pyramid, and may be, for example, a polygon or a polygonal pyramid.

With such a configuration, the line-of-sight guidance device guides the line of sight of the driver to the point that should be looked at with attention. However, in Embodiment 11, as illustrated in FIG. 11 of Embodiment 2, the line of sight is guided to the second attention target Y not because the driver has recognized the arrow displayed on each display device. In the effective visual field including the two or more display devices for displaying the line-of-sight guidance display, the driver recognizes the overall figure by visual completion, and then the line of sight is guided to the second attention target Y. Therefore, the line-of-sight guidance device can shorten the time taking to complete the guiding of the line of sight of the driver from the first attention target to the second attention target.

Embodiment 12

The line-of-sight guidance device illustrated in each above Embodiments can be applied to a system constructed by appropriately combining a navigation device, a communication terminal, a server, and the functions of applications installed therein. Here, the navigation device includes, for example, a Portable Navigation Device (PND). The communication terminal includes mobile terminals such as a cell phone, a smartphone, and a tablet.

Figure 21:
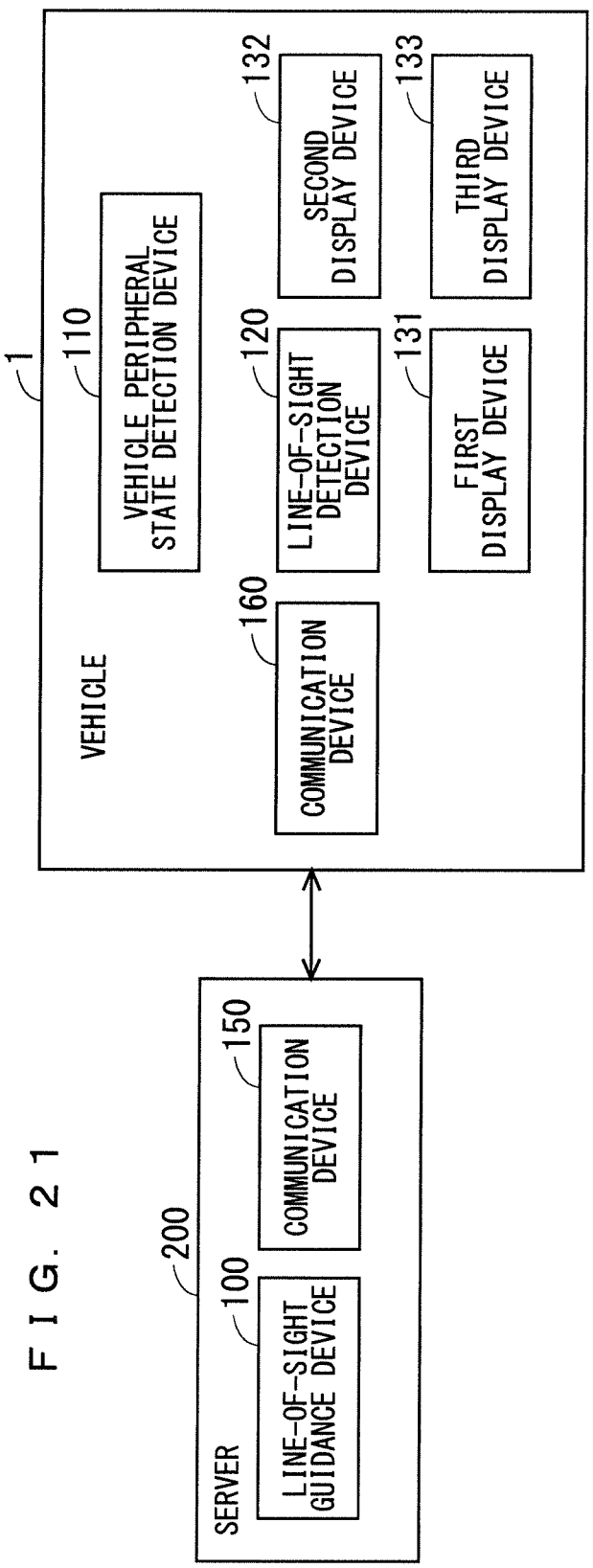
FIG. 21 A block diagram illustrating a configuration of a line-of-sight guidance device and devices that operate in association therewith according to Embodiment 12.

FIG. 21 is a block diagram illustrating a configuration of the line-of-sight guidance device 100 and devices that operate in association therewith according to Embodiment 12.

The line-of-sight guidance device 100 and a communication device 150 are provided in a server 200. The line-of-sight guidance device 100 acquires the information on the peripheral state of the vehicle 1 from the vehicle peripheral state detection device 110 provided in the vehicle 1 via a communication device 160 and the communication device 150. The line-of-sight guidance device 100 acquires the information on the line of sight of the driver from the line-of-sight detection unit 120 provided in the vehicle 1 via each of the communication devices. The line-of-sight guidance device 100 controls the two or more display devices of the first display device 131 to the third display device 133 provided in the vehicle 1 to display the line-of-sight guidance display via each communication device.

In this manner, by disposing the line-of-sight guidance device 100 in the server 200, simplification of the configuration of the vehicle-mounted device is ensured.

In addition, a decentralized arrangement may be adoptable such as a part of the functions or components of the line-of-sight guidance device 100 may be provided in the server and the other part may be provided in the vehicle. Further, the line-of-sight guidance device 100 may be provided in the vehicle 1, and may further include the vehicle peripheral state detection device 110 or the line-of-sight detection device 120.

It should be noted that Embodiments of the present invention can be arbitrarily combined and can be appropriately modified or omitted without departing from the scope of the invention.

While the invention has been described in detail, the forgoing description is in all aspects illustrative and not restrictive. It is understood that numerous other modifications and variations can be devised without departing from the scope of the invention.

EXPLANATION OF REFERENCE SIGNS 100 line-of-sight guidance device, 10 vehicle peripheral state acquisition unit, 20 line-of-sight acquisition unit, 30 display control unit, 40 attention degree calculation unit, 50 pattern calculation unit, 131 first display device, 132 second display device, 133 third display device, X first attention target, Y second attention target.

The invention claimed is:

1. A line-of-sight guidance device comprising:
a processor to execute a program; and
a non-transitory memory to store the program which, when executed by the processor, causes the processor to perform processes of
acquiring information on a peripheral state of a vehicle;
acquiring information on line of sight of the driver driving the vehicle; and
controlling two or more display units included in a predetermined visual field in association with the line of sight among a plurality of display units mounted on the vehicle, to display a line-of-sight guidance display that is a display for guiding the line of sight of the driver from a first attention target indicated by the line of sight to a second attention target associated with the peripheral state of the vehicle, the first target being an attention target actually watched by the driver, the second attention target being an attention target to be watched by the driver,
wherein the processes performed by the processor further include controlling the two or more display units to display the line-of-sight guidance display in cooperation with each other,
selecting, as the two or more display units, a display unit closest to the first attention target and a display unit located within a predetermined distance from an extending straight line connecting the first attention target and the second attention target, and
correcting the predetermined distance according to a distance between the first attention target and the driver.

2. The line-of-sight guidance device according to claim 1, wherein the display unit located within the predetermined distance from the extending straight line connecting the first attention target and the second attention target is a display unit closest to the extending straight line.

3. A line-of-sight guidance device comprising:
a processor to execute a program; and
a non-transitory memory to store the program which, when executed by the processor, causes the processor to perform processes of
acquiring information on a peripheral state of a vehicle;
acquiring information on line of sight of the driver driving the vehicle;
controlling two or more display units included in a predetermined visual field in association with the line of sight among a plurality of display units mounted on the vehicle, to display a line-of-sight guidance display that is a display for guiding the line of sight of the driver from a first attention target indicated by the line of sight to a second attention target associated with the peripheral state of the vehicle, the first target being an attention target actually watched by the driver, the second attention target being an attention target to be watched by the driver; and
learning a movement pattern of the line of sight to predict a movement destination of the line of sight based on the information on the line of sight of the driver,
wherein the processes performed by the processor further include determining a priority order of the two or more display units for displaying the line-of-sight guidance display according to the predicted movement destination of the line of sight.

* * * * *